(12) United States Patent
Gatley et al.

(10) Patent No.: US 9,126,340 B2
(45) Date of Patent: Sep. 8, 2015

(54) SYSTEMS AND METHODS FOR GRIPPING AND HANDLING A BEAD APEX

(71) Applicant: Bartell Machinery Systems, L.L.C., Rome, NY (US)

(72) Inventors: Paul D Gatley, Holland Patent, NY (US); Kevin R Razy, Lee Center, NY (US); John R Russo, II, Marcy, NY (US)

(73) Assignee: Bartell Machinery Systems, L.L.C., Rome, NY (US)

( * ) Notice: Subject to any disclaimer, the term of this patent is extended or adjusted under 35 U.S.C. 154(b) by 0 days.

(21) Appl. No.: 14/510,546

(22) Filed: Oct. 9, 2014

(65) Prior Publication Data
US 2015/0108780 A1 Apr. 23, 2015

Related U.S. Application Data

(60) Provisional application No. 61/892,861, filed on Oct. 18, 2013.

(51) Int. Cl.
| | |
|---|---|
| *B29D 30/32* | (2006.01) |
| *B25J 15/00* | (2006.01) |
| *B29D 30/00* | (2006.01) |
| *B29D 30/48* | (2006.01) |

(52) U.S. Cl.
CPC ......... *B25J 15/0028* (2013.01); *B29D 30/0016* (2013.01); *B29D 2030/0038* (2013.01); *B29D 2030/482* (2013.01)

(58) Field of Classification Search
USPC ......... 294/104, 106, 192, 196, 197, 198, 207, 294/86.4, 902; 156/131, 403
See application file for complete search history.

(56) References Cited

U.S. PATENT DOCUMENTS

| | | | | |
|---|---|---|---|---|
| 2,754,708 | A * | 7/1956 | Peterson | 269/224 |
| 3,576,057 | A * | 4/1971 | Hoy | 294/902 |
| 3,967,946 | A * | 7/1976 | Campbell | 294/902 |
| 4,148,680 | A * | 4/1979 | Harding | 156/403 |
| 4,226,663 | A | 10/1980 | Pirovano et al. | |
| 4,293,358 | A * | 10/1981 | Loeffler et al. | 156/403 |
| 4,309,235 | A * | 1/1982 | Mallory et al. | 156/131 |
| 4,405,168 | A * | 9/1983 | Fritzsche et al. | 294/104 |
| 4,565,400 | A * | 1/1986 | Nakashima et al. | 294/197 |
| 4,572,564 | A * | 2/1986 | Cipolla | 294/207 |
| 4,854,626 | A * | 8/1989 | Duke | 294/104 |
| 4,933,034 | A | 6/1990 | Kokubu et al. | |
| 5,133,817 | A | 7/1992 | Pizzorno | |
| 5,209,536 | A * | 5/1993 | Rogers et al. | 294/197 |
| 5,328,533 | A | 7/1994 | Yasuno et al. | |
| 5,403,057 | A * | 4/1995 | Sugito et al. | 294/119.1 |
| 8,794,288 | B2 * | 8/2014 | Janszen et al. | 156/403 |

FOREIGN PATENT DOCUMENTS

DE 2854359 10/1980

OTHER PUBLICATIONS

International Search Report and Written Opinion for PCT/US2014/059846 dated Feb. 13, 2015, 12 pgs.

\* cited by examiner

*Primary Examiner* — Paul T Chin
(74) *Attorney, Agent, or Firm* — Brinks Gilson & Lione (57) ABSTRACT

A system for handling a bead apex comprises a first jaw having open and closed states, which is configured to engage a first surface of a bead apex in the closed state. The system further comprises a second jaw having open and closed states, and a plurality of grippers coupled to the second jaw. Selected ones of the plurality of grippers are configured to engage a second surface of the bead apex in the closed state of the second jaw. Further, at least one of the plurality of grippers comprises a tapered end surface.

21 Claims, 8 Drawing Sheets

SYSTEMS AND METHODS FOR GRIPPING AND HANDLING A BEAD APEX

PRIORITY CLAIM

This invention claims the benefit of priority of U.S. Provisional Application Ser. No. 61/892,861, entitled "Systems and Methods for Gripping and Handling a Bead Apex," filed Oct. 18, 2013, the disclosure of which is hereby incorporated by reference in its entirety.

BACKGROUND

The present embodiments relate generally to systems and methods for gripping and handling a bead apex, such as one applied to a bead ring, in an improved manner.

Many types of vehicular tires include beads surrounding the openings that engage the wheel rim. In general, beads comprise a wire coil in the nature of a hoop formed by winding multiple turns of a coated wire on a suitable bead forming apparatus. The bead may be made up of multiple, radially and axially arranged turns of a single wire or, in so-called weftless beads, of radially stacked layers of a flat ribbon including a plurality of side-by-side wires.

Techniques have been used for applying a bead apex to the peripheral surface of a bead ring. In general, the bead apex is formed by extrusion of a material to a relatively thin shape having a generally triangular cross-section. The extruded bead apex then is maneuvered and applied to the peripheral surface of a bead ring, often times without effective gripping capability of the bead apex during the process. Moreover, the bead apex may be held with levels of tension applied to the bead ring that may cause undesirable end results when the bead apex is applied to the bead ring, prior to these components being passed to subsequent tire forming equipment.

SUMMARY

A system for handling a bead apex comprises a first jaw having open and closed states, which is configured to engage a first surface of a bead apex in the closed state. The system further comprises a second jaw having open and closed states, and a plurality of grippers coupled to the second jaw. Selected ones of the plurality of grippers are configured to engage a second surface of the bead apex in the closed state of the second jaw. Further, at least one of the plurality of grippers comprises a tapered end surface.

In one embodiment, selected ones of the plurality of grippers comprise retracted and extended states, and are configured to engage the second surface of the bead apex in the extended states. Selected ones of the plurality of grippers may be configured to be actuated at the same as movement of other ones of the plurality of grippers are configured to be inhibited.

In one embodiment, each of the plurality of grippers are actuated at the same pressure from their respective retracted states to their expanded states. In an alternative embodiment, at least two of the plurality of grippers are actuated at different pressures relative to each other from their retracted states to their expanded states.

In one embodiment, at least one of the plurality of grippers comprises a tapered end and at least another one of the plurality of grippers comprises a blunt end. The first jaw may comprise a generally flat engaging surface.

The first jaw may be positioned vertically below the second jaw. The first jaw may be coupled to a frame at a first pivot point, and the second jaw may be coupled to the frame at a second pivot point, wherein the first and second jaws rotate circumferentially about their respective pivot points from their respective open to closed states.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Referring to the drawings, a system 20 for gripping and handling an exemplary bead apex 80 is shown and described. The system 20 comprises an upper jaw 30 and a lower jaw 40, which selectively grip and handle the bead apex 80 as described further below.

The upper jaw 30 generally comprises an elongated main body 31, a plurality of grippers 32, and an actuation housing 33, as shown in various views and stages between FIGS. 1-6. The lower jaw 40 generally comprises an elongated main body 41 and an engaging surface 42.

The upper and lower jaws 30 and 40 are coupled to a frame 50. The frame 50 may comprise any suitable shape. In this non-limiting example, the frame 50 is generally vertically oriented relative to the ground, but other configurations are possible. The upper and lower jaws 30 and 40 are rotatable with respect to the frame 50 about pivot points 35 and 45, respectively. A suitable actuation mechanism may be used to effect rotation of the upper and lower jaws 30 and 40 about their respective pivot points 35 and 45.

Figure 1:
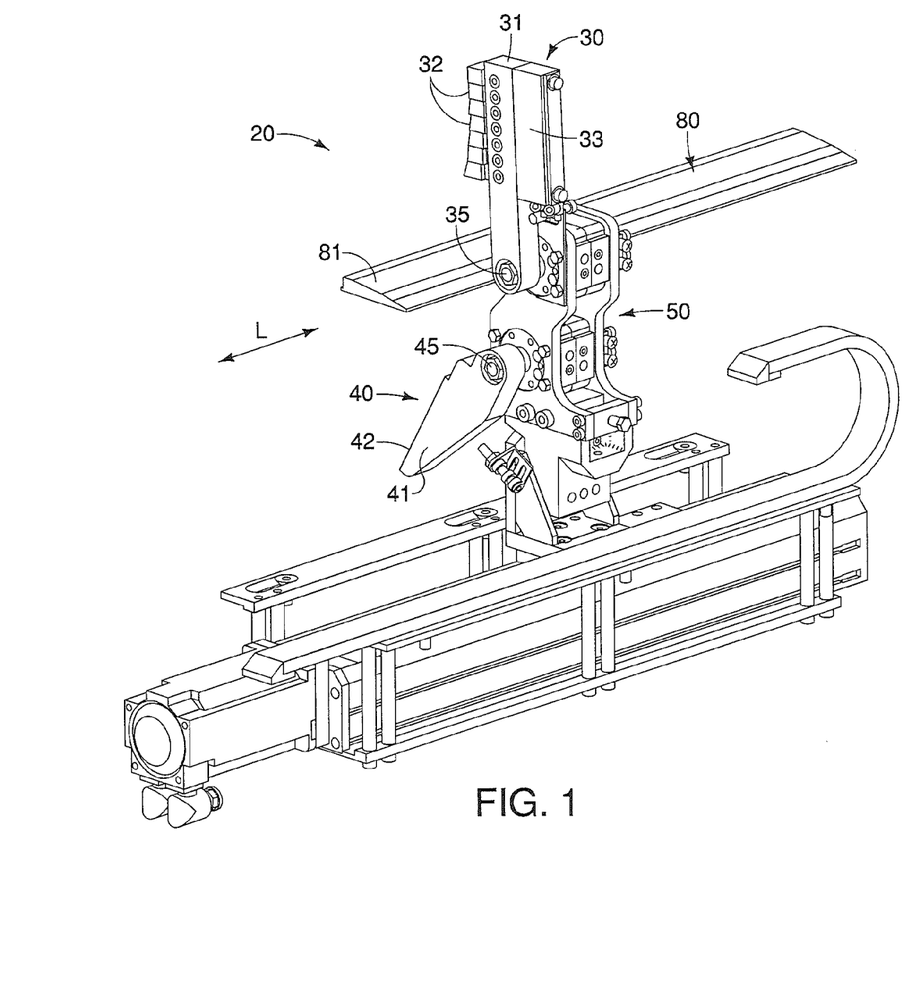
FIG. 1 is a schematic perspective view of selected components of a system for gripping and handling a bead apex, with upper and lower jaws in open states.

Referring to FIG. 1, both the upper and lower jaws 30 and 40 are shown in open states, in which they are each spaced apart from an axis L defined by a pathway of the bead apex 80. The upper jaw 30 is depicted as being rotated about 90 degrees above the axis L in the open state, while the lower jaw 40 is depicted as being rotated about 40 to about 70 degrees below the axis L in the open state, but it will be appreciated that either of the jaws 30 and 40 may be rotated greater or lesser amounts with respect to the axis L in their respective open states.

Figure 2:
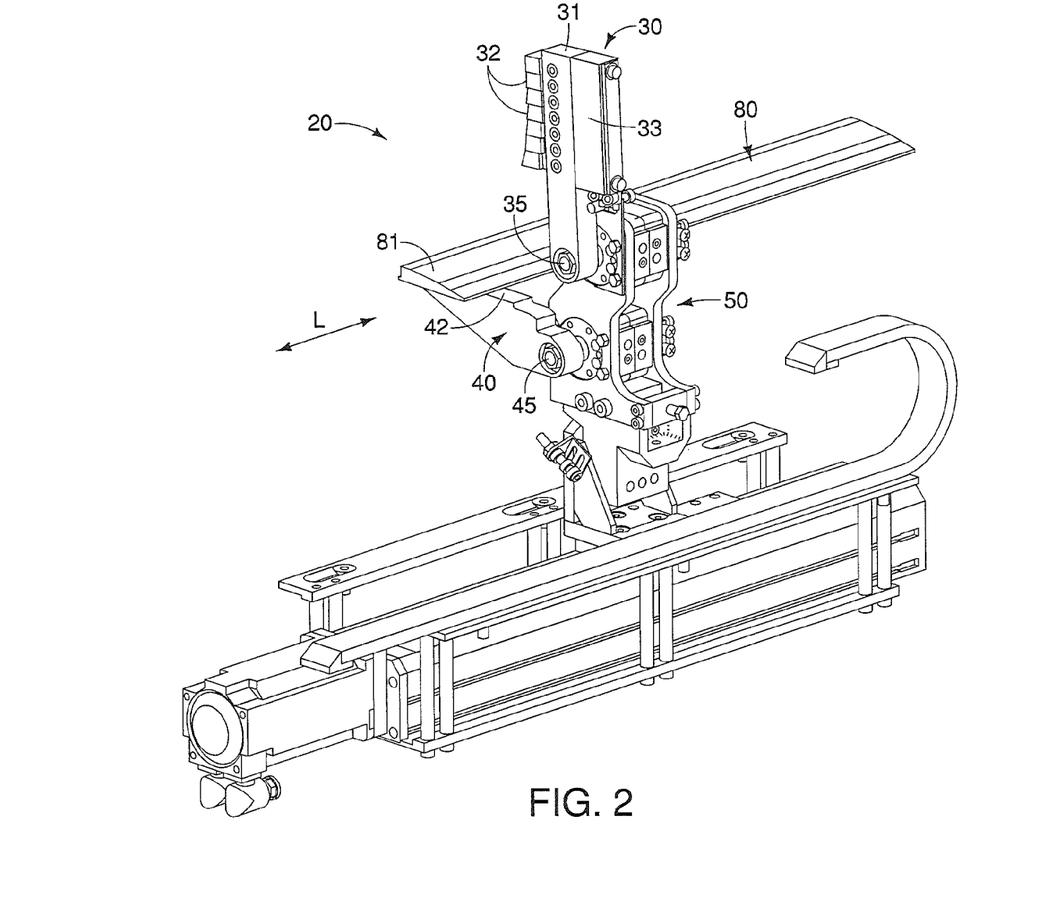
FIG. 2 is a perspective view of the system of FIG. 1 with the lower jaw in a closed state.

Referring to FIG. 2, the lower jaw 40 is shown in a closed state, in which it is rotated circumferentially upward, about the pivot point 45, such that the lower jaw 40 is substantially adjacent to a pathway of the axis L defined by the bead apex 80. In one embodiment, the engaging surface 42 of the lower jaw 40 may engage the bead apex 80 when the lower jaw 40 is in the closed state.

Figure 3:
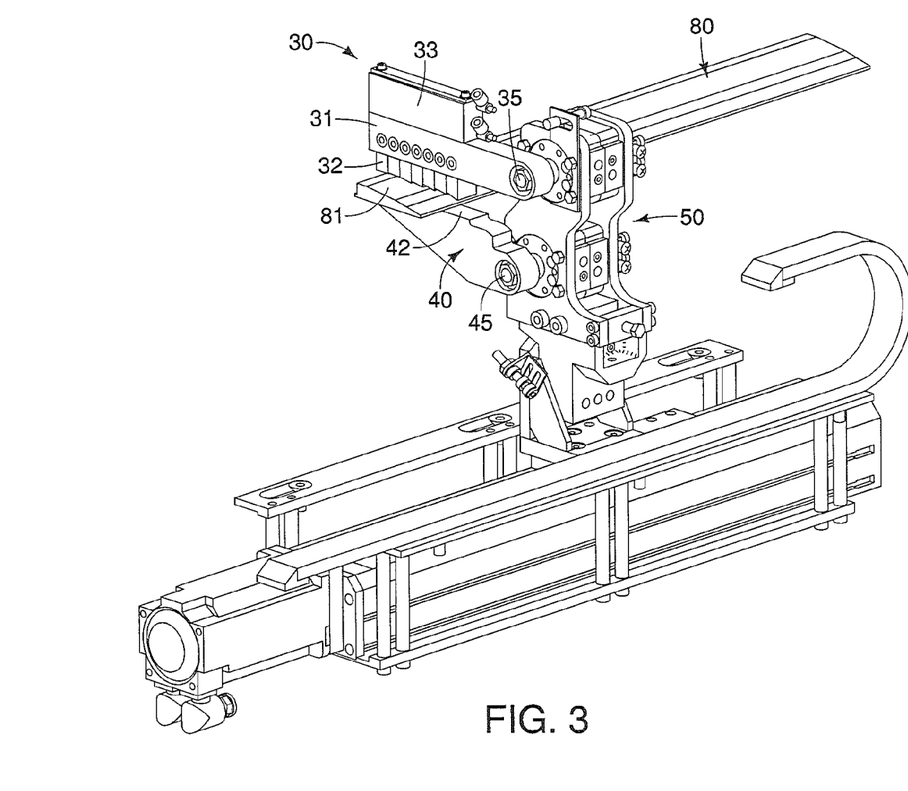
FIGS. 3-4 are, respectively, perspective and side views of the system of FIGS. 1-2 with the upper and lower jaws in a closed state, and with a plurality of grippers in retracted states.
Figure 4:
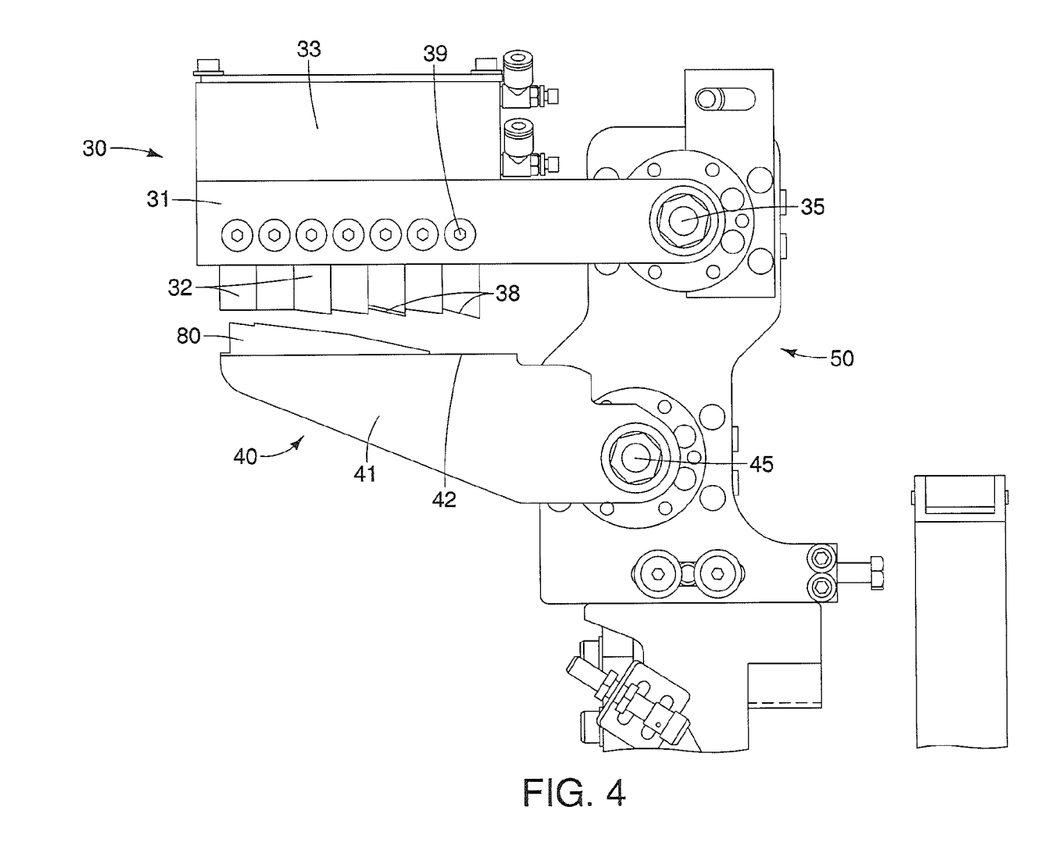

Referring to FIGS. 3-4, the upper jaw 40 is shown in a closed state, in which it rotated circumferentially downward, about the pivot point 35, such that the elongated main body 31 of the upper jaw 30 is substantially adjacent to a pathway of the axis L defined by the bead apex 80. In one embodiment, the elongated main body 31 is positioned slightly above the pathway of the bead apex 80, as best seen in FIG. 4.

In the state of FIGS. 3-4, the plurality of grippers 32 of the upper jaw 30 are shown in a retracted state, in which the plurality of grippers 32 are positioned upward, i.e., more towards the elongated main body 31 and further from the pathway of the bead apex 80. In the retracted state, the plurality of grippers 32 do not engage the bead apex 80, as shown in FIG. 4.

Figure 5:
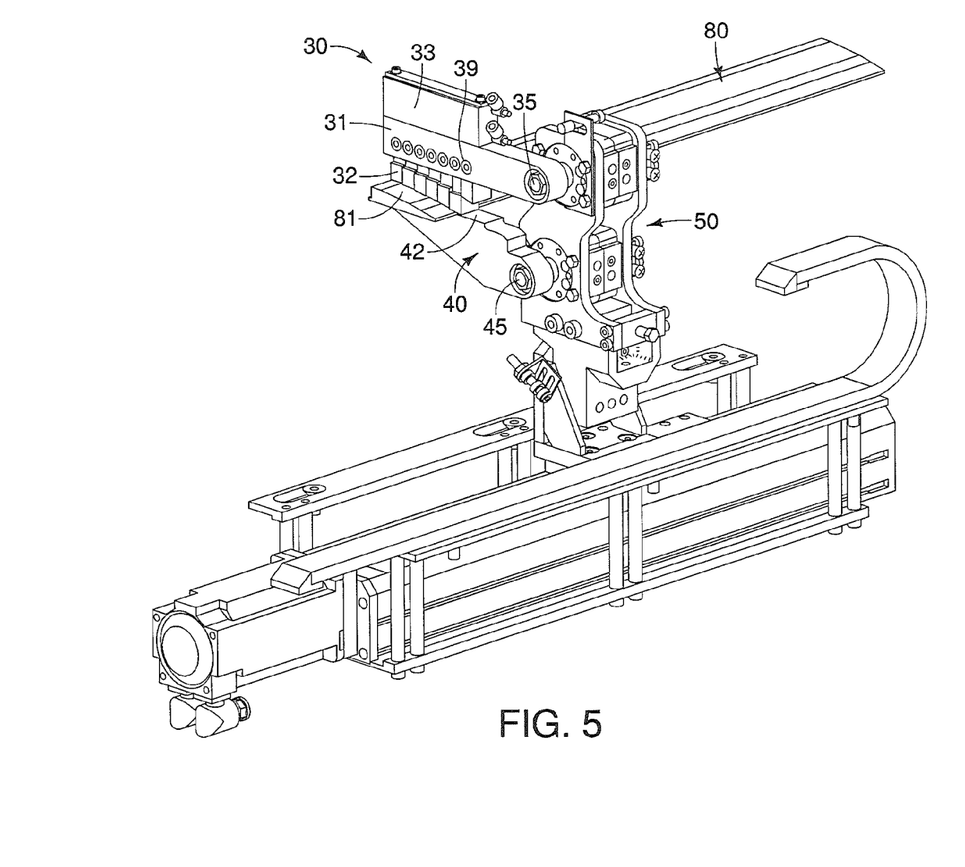
FIGS. 5-6 are, respectively, perspective and side views of the system of FIGS. 1-2 with the upper and lower jaws in a closed state, and with a plurality of grippers in extended states.
Figure 6:
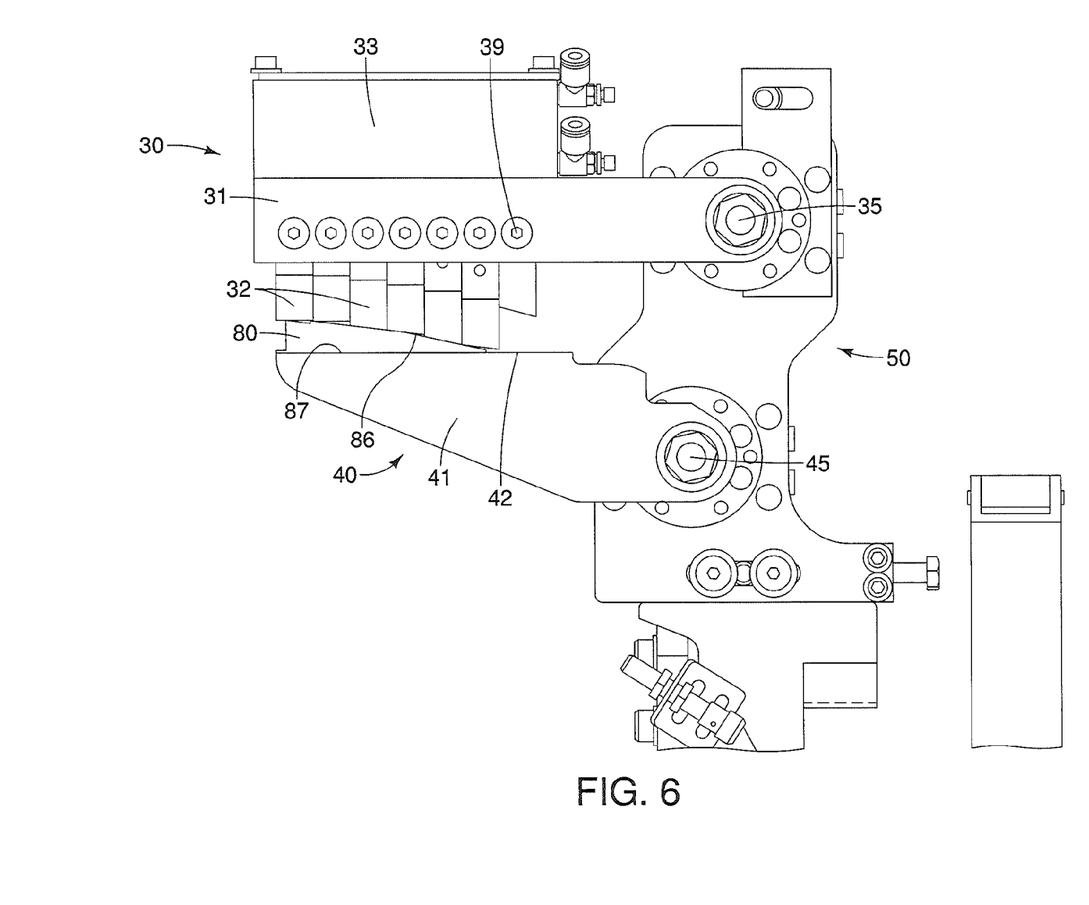

Referring to FIGS. 5-6, selected ones of the plurality of grippers 32 of the upper jaw 30 are shown in an extended state, in which selected ones of the plurality of grippers 32 are positioned downward, i.e., closer to the pathway of the bead apex 80. The selected ones of the plurality of grippers 32 may be moved from the retracted state of FIGS. 3-4 to the extended state of FIGS. 5-6 using suitable actuation mechanisms, such as at least one pneumatic cylinder housed within the actuation housing 33.

Figure 7A:
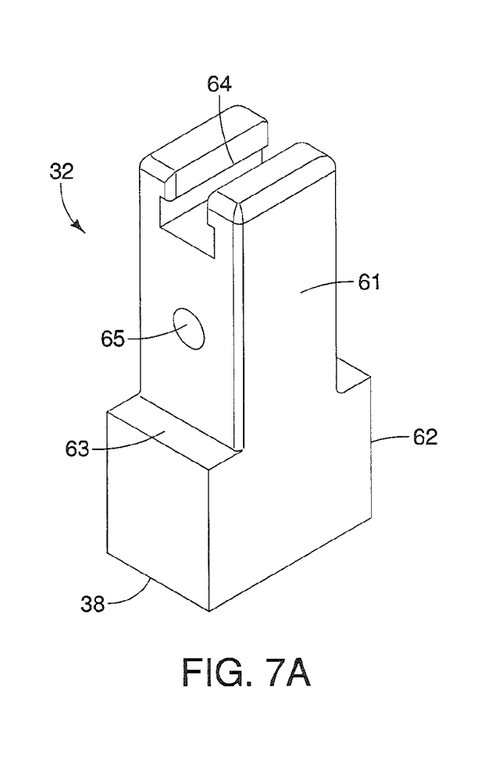
FIGS. 7A-7B are perspective and side views, respectively, depicting features of an exemplary gripper.
Figure 7B:
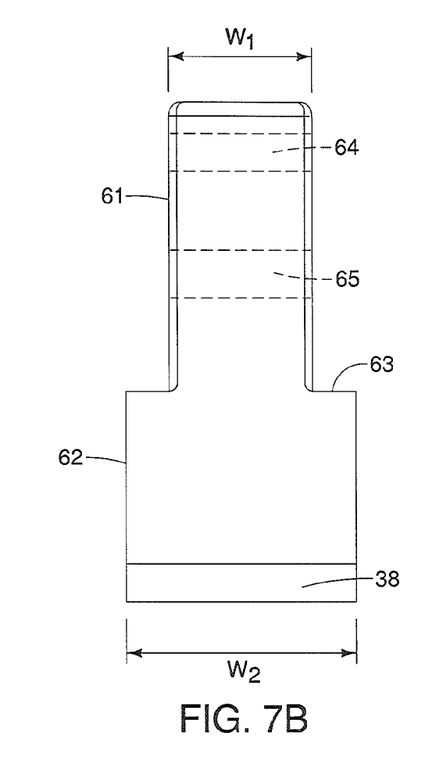

Referring to FIGS. 7A-7B, further features of an exemplary gripper 32 are shown and described. The exemplary gripper 32 comprises a first region 61 having a first width $w_1$ and a second region 62 having a second width $w_2$, where the second width $w_2$ is greater than the first width $w_1$, and a stepped region 63 separates the first and second regions 61 and 62. In the retracted state, the stepped region 63 abuts the elongated main body 31, thus keeping the second region 62 generally outside of the elongated main body 31, as depicted in FIG. 4. In the extended state, the stepped region 63 extends away from the elongated main body 31 to allow the tapered end surface 38 of the second region 62 to engage the bead apex 80, as depicted in FIG. 6.

The first region 61 is generally disposed within the elongated main body 31, and comprises a notch 64 and a bore 65, as shown in FIGS. 7A-7B. The notch 64 is coupled to a linkage, which in turn may be operatively coupled to the actuation mechanism, such as a pneumatic cylinder.

The bore 65 formed in each of the grippers 32 aligns with a blocking element 39, such as a movable screw selectively extending through the elongated main body 31, as depicted in FIGS. 4-6. When the blocking element 39 is selectively advanced by a user, the blocking element 39 may enter into the bore 65 of the respective gripper 32, thereby inhibiting movement of the particular gripper 32 from the retracted state to the extended state, notwithstanding actuation of the actuation mechanism. In the non-limiting example of FIG. 6, only the blocking element 39 on the right end has been deployed to block movement of the gripper 32 on the right end.

In one embodiment, one actuation mechanism, e.g., one pneumatic cylinder, is provided within the actuation housing 33, and is operatively coupled to each of the plurality of grippers 32, for example, using a manifold. Accordingly, when a single cylinder or other mechanism is actuated, each of the plurality of grippers 32 may be simultaneously actuated to move from the retracted to extended states, unless the blocking element 39 has been selectively deployed in advance.

In an alternative embodiment, multiple different actuation mechanisms may be provided within the actuation housing 33, e.g., one pneumatic cylinder per each gripper 32. In this embodiment, different actuations mechanisms may provide different pressures to different grippers 32. For example, it may be advantageous to provide a first and greatest pressure (psi) to selected ones of grippers 32 on the left side in FIG. 6, a second or intermediate pressure to selected intermediate grippers 32, and a third and lowest pressure to selected grippers 32 on the right side in FIG. 6. Advantageously, in this case, a relatively high pressure for a particular gripper 32 is provided in the vicinity of a relatively thick part of the bead apex 80, and therefore, these sections of the bead apex 80 may be held more securely. Conversely, a relatively low pressure for a particular gripper 32 is provided in the vicinity of a relatively thin part of the bead apex 80, and therefore, particular grippers 32 do not squeeze finer rubber portions of the bead apex 80 with an excessive and potentially damaging pressure, while allowing for some potentially desirable movement at this portion of the bead apex.

In either actuation technique, in the extended state, at least one of the plurality of grippers 32 engages a surface of the bead apex 80, such that the bead apex 80 is generally sandwiched between the engaging surface 42 of the lower jaw 40 and selected ones of the plurality of grippers 32 of the upper jaw 30, as depicted in FIG. 6.

Advantageously, at least one of the plurality of grippers 32 comprises a tapered end surface 38 that engages a tapered surface 86 of the bead apex 80 to enhance the engagement with the bead apex 80, as depicted in FIG. 6. In this manner, various triangular-shaped cross-sections of bead apices, such as the bead apex 80 depicted in FIG. 6, may be gripped by selected ones of the plurality of grippers 32, with a generally complementary mating of tapered surfaces, thereby providing an enhanced surface engagement between the grippers 32 and the bead apex 80. This may enhance contact across radial edges of the bead apex 80, particularly while the bead apex 80 is held while being applied to a bead ring.

Notably, a surface 87 of the bead apex 80, which generally opposes the tapered surface 86, may be generally flat and may engage the generally flat engaging surface 42 of the lower jaw 40, as depicted in FIG. 6. In this manner, a bead apex 80 having one generally flat side and one at least partially tapered side may be gripped by opposing jaws, where one jaw is generally flat and the other comprises at least one tapered gripper, thus providing a secure engagement on both sides of the bead apex. Due to a substantially flush fit between the at least one tapered gripper and the bead apex, the amount of deformation is reduced when a rubber surface is clamped, which may reduce markings on the final product.

It should be noted that only selected ones of the plurality of grippers 32 may be tapered, and the angle of the taper may be different among grippers 32. As best depicted in the retracted state of FIG. 4, in this non-limiting example, the first two grippers 32 from the left comprise generally flat surfaces that selectively engage the bead apex 80, while the third, fourth and fifth grippers 32 from the left comprise a relatively sharp taper, while the sixth gripper 32 from the left comprises a relatively shallow taper, and the seventh gripper 32 from the left comprises a relatively sharp taper.

As a further advantage, a user does not need to manually remove the grippers 32 for different tapered bead apex profiles, e.g., different triangular shapes when viewed in cross-section, in part because the blocking elements 39 can be selectively engaged to omit selected grippers 32 depending on different bead apex profiles. Rather, a user simply needs to select which of the plurality of grippers 32 should be actuated to best match a bead apex profile being gripped. Moreover, the gripping force at each gripper 32 can be varied, as discussed above, and therefore the grippers 32 are able to engage a tapered surface of different bead apices in a custom manner, all without removing the grippers 32.

Figure 8:
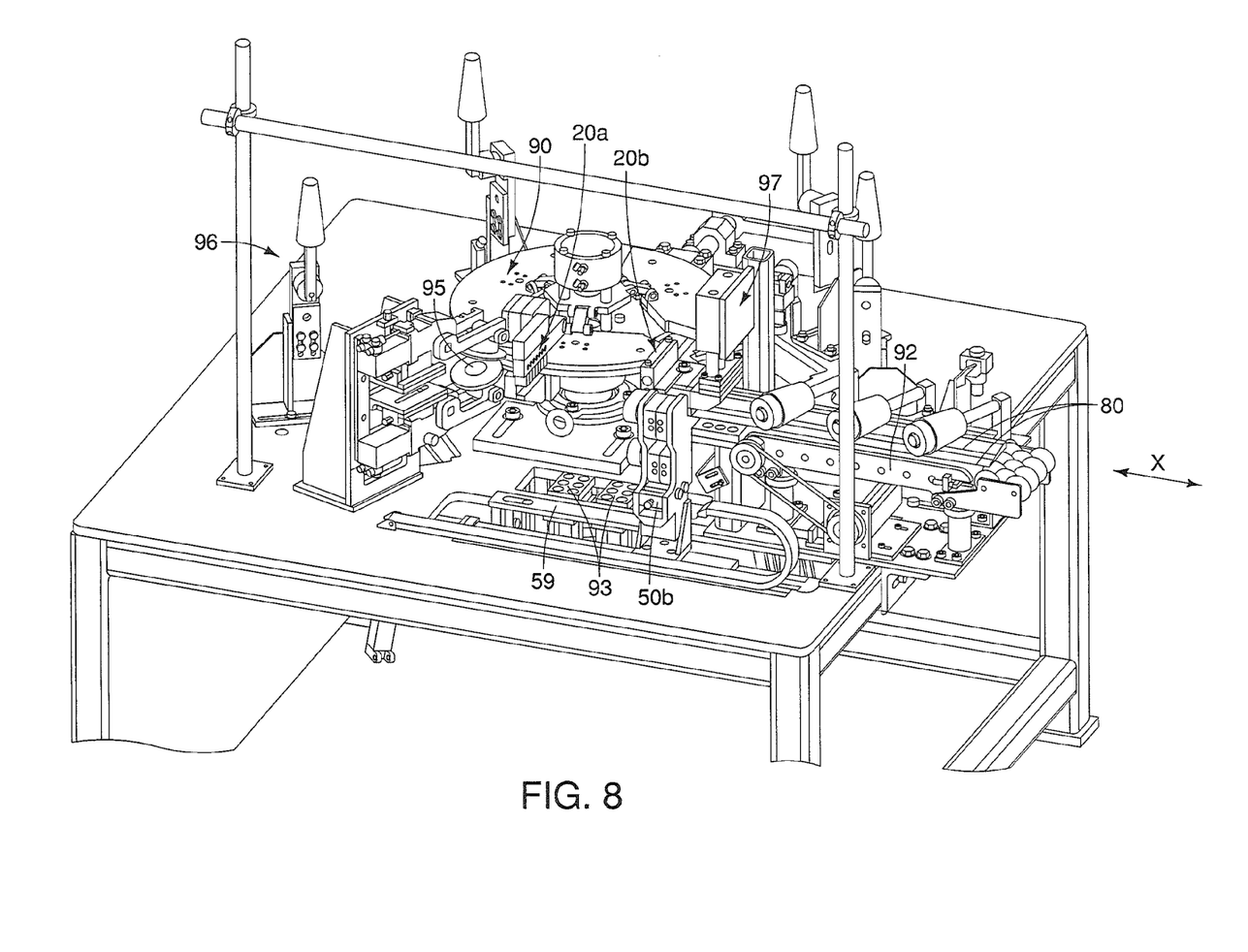
FIG. 8 is a perspective view of additional components of a system for gripping and handling a bead apex.

Referring now to FIG. 8, additional systems and methods are described that may be used in conjunction with the system 20 for gripping and handling a bead apex that was described in FIGS. 1-7 above. In FIG. 8, the additional systems generally assist in allowing a consistent application of the bead apex 80 to a bead ring that is held on a winder 90.

In this embodiment, a leading edge gripper 20*a* and a trailing edge gripper 20*b* are used to couple the bead apex 80 to a bead ring. Each of the leading edge gripper 20*a* and the trailing edge gripper 20*b* may be provided in accordance with the system 20 for gripping and holding a bead apex, as described in detail in FIGS. 1-7 above. It should be noted that the leading edge gripper 20*a* is generally secured to the winder 90 and rotates with the winder 90, while the trailing edge gripper 20*b* stands apart from the winder 90 and is capable of longitudinal movement along a conveyor axis X, as shown in FIG. 8.

In one exemplary method, an extruded bead apex 80 has a leading edge 81, best seen in FIG. 1, which is cut when unclamped and without stress. A conveyor 92, shown in FIG. 8, then advances the bead apex 80 for a determined distance in an unclamped state without stress. Then, in a next step, the lower jaw 40 of the trailing edge gripper 20*b* moves from the open state to the closed state to engage a lower surface of the bead apex 80. Subsequently, the upper jaw 30 of the trailing edge gripper 20*b* moves from the open state to the closed state, and selected ones of the plurality of grippers 32 of the trailing edge gripper 20*b* move from the retracted state to the extended state to engage an upper surface of the bead apex 80. At this time, the leading edge 81 of the bead apex 80 is secured within the trailing edge gripper 20*b*, as generally shown in the manner depicted in FIG. 6 above.

In a next step, the trailing edge gripper 20*b* traverses towards the winder 90, e.g., by moving a frame 50*b* of the trailing edge gripper 20*b* longitudinally along a rail 59, in the direction X from right to left in FIG. 8. At the same time the trailing edge gripper 20*b* traverses towards the winder 90, the conveyor 92 is left on to reduce stresses and stretch of the bead apex 80 that may be incurred by the conveyor 92 moving slower than the trailing edge gripper 20*b*. A ratio of speed of the trailing edge gripper 20*b* moving along the rail 59 to speed of the conveyor 92 may be adjusted to reduce imposition of stress to the bead apex 80.

As the trailing edge gripper 20*b* traverses towards the winder 90, one or more support tables 93 may be selectively deployed, from a lowered position shown in FIG. 8 to a raised position at a height approximate to the bead apex travel path, to provide support to the bead apex 80 as it travels in the longitudinal direction. The support tables 93 begin in a lowered position so they do not interfere with movement of the frame 50*b* and the lower jaw 40 of the trailing edge gripper 20*b* in a direction towards the winder 90, and once the trailing edge gripper 20*b* has passed the support tables 93, the tables 93 are raised to portions that support the bead apex 80 where it is suspended between the trailing edge gripper 20*b* and the conveyor 92.

When the trailing edge gripper 20*b* approaches a tangent point of a bead ring disposed on a periphery of the winder 90, the winder 90 begins to rotate. After the tangent point of the bead ring is reached, the trailing edge gripper 20*b* no longer moves longitudinally and the winder 90 is no longer rotated. With these components stationary, the lower jaw 40 of the leading edge gripper 20*a* moves from the open state to the closed state to engage a lower surface of the bead apex 80. Subsequently, the upper jaw 30 of the leading edge gripper 20*a* moves from the open state to the closed state, and selected ones of the plurality of grippers 32 of the leading edge gripper 20*a* move from the retracted state to the extended state to engage an upper surface of the bead apex 80. At this time, the leading edge 81 of the bead apex 80 is secured within the leading edge gripper 20*a*, as generally shown in the manner depicted in FIG. 6 above. Further, at this time, the grippers 32 of the trailing edge gripper 20*b* are retracted, and the upper and lower jaws 30 and 40 of the trailing edge gripper 20*b* each move from the closed to open states, thereby freeing the bead apex 80 from engagement with the trailing edge gripper 20*b*. The trailing edge gripper 20*b* then moves back towards its starting position, i.e., in a direction from left to right along the axis X via the rail 59.

In a next step, the winder 90 begins to rotate in a circumferential direction. Optionally, one or more additional support tables 53 may be deployed to further support the bead apex 80 as it is advanced by rotation of the winder 90.

The winder 90 then stops after the leading edge gripper 20*a* reaches a position beyond stitching wheels 95. In one example, stitching wheels 95 comprise upper and lower wheels, where the lower stitching wheel is raised and the upper stitching wheel is lowered during actuation. Once the upper and lower stitching wheels 95 are in contact with the bread apex 80, the winder 90 will resume circumferential rotation, as the conveyor 92 continues to feed the extruded bead apex 80. During this stage, the stitching wheels 95 are securing the bead apex 80 circumferentially about the bead ring. During the process, one or more anti-cup rollers 96, shown in FIG. 8, may be positioned or otherwise activated for support in order to keep the bead apex 80 from cupping. A ratio of speed of the leading edge gripper 20*a* moving about the winder 90 to speed of the conveyor 92 may be adjusted to reduce imposition of stress to the bead apex 80 while it is being advanced around the winder 90 and secured to the bead ring.

At a programmable and predetermined degree of rotation, the winder 90 will cease to circumferentially rotate in preparation for a cutting position. When the winder 90 stops, the conveyor 92 is operable to pay out a given amount of the bead apex 80, in order to remove potential stresses within the bead apex that has yet to be applied to the bead ring.

In a next step, the trailing edge gripper 20*b* is once again actuated to engage the bead apex 80 by closing the lower jaw 40 and then the upper jaw 30, and extending at least one of the plurality of grippers 32, as explained in detail above. At this time, a knife 97 is actuated to cut the bead apex 80 and create a trailing edge of the bead apex 80. It is noted that the cutting by the knife 97 occurs under minimal, if any, stress being applied to the bead apex 80. With the trailing edge gripper 20*b* movement temporarily halted, the winder 90 is rotated circumferentially a programmed number of degrees in order to re-tension to the bead apex 80, i.e., the leading edge of the bead apex 80 held by the leading edge gripper 20*a* is rotated circumferentially a distance while the trailing edge of the bead apex 80 held by the trailing edge gripper 20*b* is held stationary near the knife 97. Advantageously, this sequence of movement of components reduces the phenomena known as "dog-ear" bending, which may be undesirable.

Once the bead apex 80 is under tension, the winder 90 continues to move circumferentially while the trailing edge gripper 20b is then advanced along the rail 59, until a time that the leading edge gripper 20a and the trailing edge gripper 20b are in close proximity to one another, thereby aligning the leading and trailing edges of the bead apex 80. For illustrative purposes, referring to FIG. 8, at this time the trailing edge gripper 20b would be positioned slightly clockwise to the leading edge gripper 20a. The seam between the leading and trailing edges of the bead apex 80 is then closed by application of appropriate pressure to one another. It is noted that, once the bases of the leading and trailing edges of the bead apex 80 are brought together, the trailing edge gripper 20b and the leading edge gripper 20a move in a synchronized manner towards one another, in order for the pressure-sensitive rubber of the bead apex to be joined together. Subsequently, the leading and trailing edge grippers 20a and 20b each release the bead apex 80 by moving from their respective closed to open states, thereby releasing the finished bead apex. The leading and trailing edge grippers 20a and 20b then may move back to their respective starting positions in order to assemble a subsequent extruded bead apex 80.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

We claim:

1. A system for handling a bead apex, the system comprising:
    a first jaw having open and closed states, and configured to engage a first surface of a bead apex in the closed state;
    a second jaw having open and closed states; and
    a plurality of grippers coupled to the second jaw and configured to engage a second surface of the bead apex in the closed state of the second jaw,
    wherein a first gripper of the plurality of grippers has a first shape at an end that is configured to engage the second surface of the bead apex, and wherein a second gripper of the plurality of grippers has a second shape at an end that is configured to engage the second surface of the bead apex, wherein the first shape of the first gripper is different than the second shape of the second gripper, and
    wherein the first and second grippers are distinctly movable relative to each other.

2. The system of claim 1, wherein the plurality of grippers comprise retracted and extended states, and are configured to engage the second surface of the bead apex in the extended states.

3. The system of claim 2, wherein the first gripper of the plurality of grippers is configured to be actuated at a time when movement of the second gripper of the plurality of grippers is configured to be inhibited.

4. The system of claim 2, wherein each of the plurality of grippers are actuated at the same pressure from the retracted state to the expanded state.

5. The system of claim 2, wherein at least two of the plurality of grippers are actuated at different pressures relative to each other from the retracted state to the expanded state.

6. The system of claim 1, wherein the first gripper of the plurality of grippers comprises a tapered end and the second gripper of the plurality of grippers comprises a blunt end.

7. The system of claim 1, wherein the first jaw comprises a generally flat engaging surface.

8. The system of claim 1, wherein the first jaw is positioned vertically below the second jaw.

9. The system of claim 8, wherein the first jaw is coupled to a frame at a first pivot point, and the second jaw is coupled to the frame at a second pivot point, wherein the first and second jaws rotate circumferentially about their respective pivot points from their respective open to closed states.

10. A method for handling a bead apex, the method comprising:
    providing a first jaw that pivots between open and closed states, and is configured to engage a first surface of a bead apex in the closed state;
    providing a second jaw that pivots between open and closed states;
    providing a plurality of grippers coupled to the second jaw; and configured to engage a second surface of the bead apex in the closed state of the second jaw,
    wherein first and second grippers of the plurality of grippers are distinctly movable relative to each other.

11. The method of claim 10, wherein the plurality of grippers comprise retracted and extended states, and are configured to engage the second surface of the bead apex in the extended states.

12. The method of claim 11, wherein the first gripper of the plurality of grippers is configured to be actuated at a time when movement of the second gripper of the plurality of grippers is configured to be inhibited.

13. The method of claim 11, further comprising actuating each of the plurality of grippers at the same pressure from the retracted state to the expanded state.

14. The method of claim 11, further comprising actuating at least two of the plurality of grippers at different pressures relative to each other from the retracted state to the expanded state.

15. The method of claim 10, wherein the first gripper of the plurality of grippers comprises a tapered end and the second gripper of the plurality of grippers comprises a blunt end.

16. The method of claim 10, wherein the first jaw is positioned vertically below the second jaw.

17. A system for handling a bead apex, the system comprising:
    a first jaw having open and closed states, and configured to engage a first surface of a bead apex in the closed state;
    a second jaw having open and closed states; and
    a plurality of grippers coupled to the second jaw and configured to engage a second surface of the bead apex in the closed state of the second jaw,
    wherein the plurality of grippers comprise retracted and extended states, and are configured to engage the second surface of the bead apex in the extended states,
    wherein the plurality of grippers are capable of being in the retracted states when the second jaw is in the closed state, and
    wherein the second jaw comprises a main body, and the ends of the grippers move away from the main body when the grippers go from the refracted state to the extended state.

18. The system of claim 17, wherein at least one of the plurality of grippers comprises a tapered end surface.

19. The system of claim 17, wherein a first gripper of the plurality of grippers is configured to be actuated at a time when movement of a second gripper of the plurality of grippers is configured to be inhibited.

20. The system of claim 17, wherein the first jaw is positioned vertically below the second jaw.

21. A system for handling a bead apex, the system comprising:
- a first jaw having open and closed states;
- a second jaw having open and closed states; and
- a plurality of grippers coupled to the second jaw and configured to engage a second surface of the bead apex in the closed state of the second jaw,
- wherein the first jaw directly engages the first surface of the bead apex in the closed state, the plurality of grippers directly engage the second surface of the bead apex, and
- wherein the first jaw comprises a different shape than the plurality of grippers.

* * * * *